March 23, 1954 — E. V. BUNTING — 2,672,802
AUXILIARY HYDRAULIC APPARATUS FOR TRACTORS
Filed Jan. 2, 1948 — 2 Sheets-Sheet 1
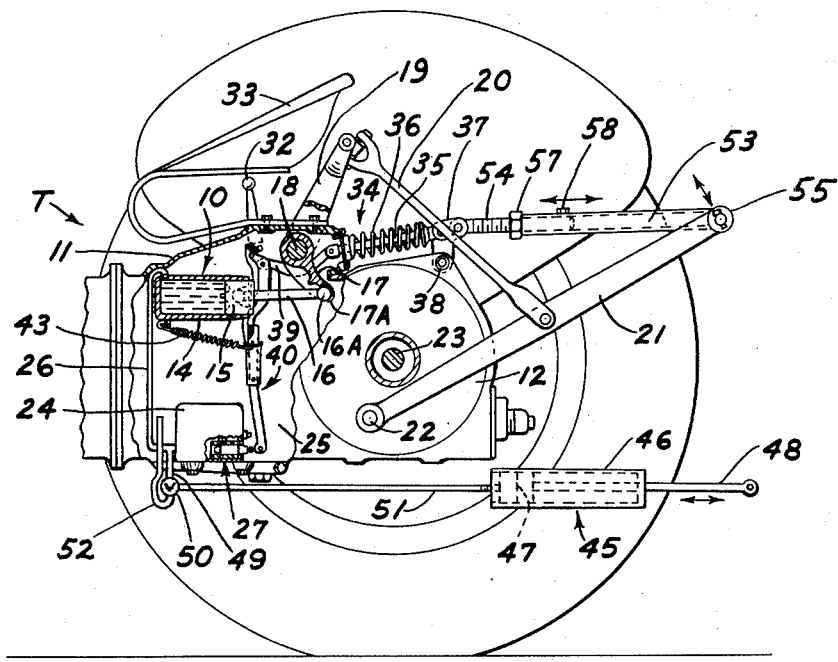
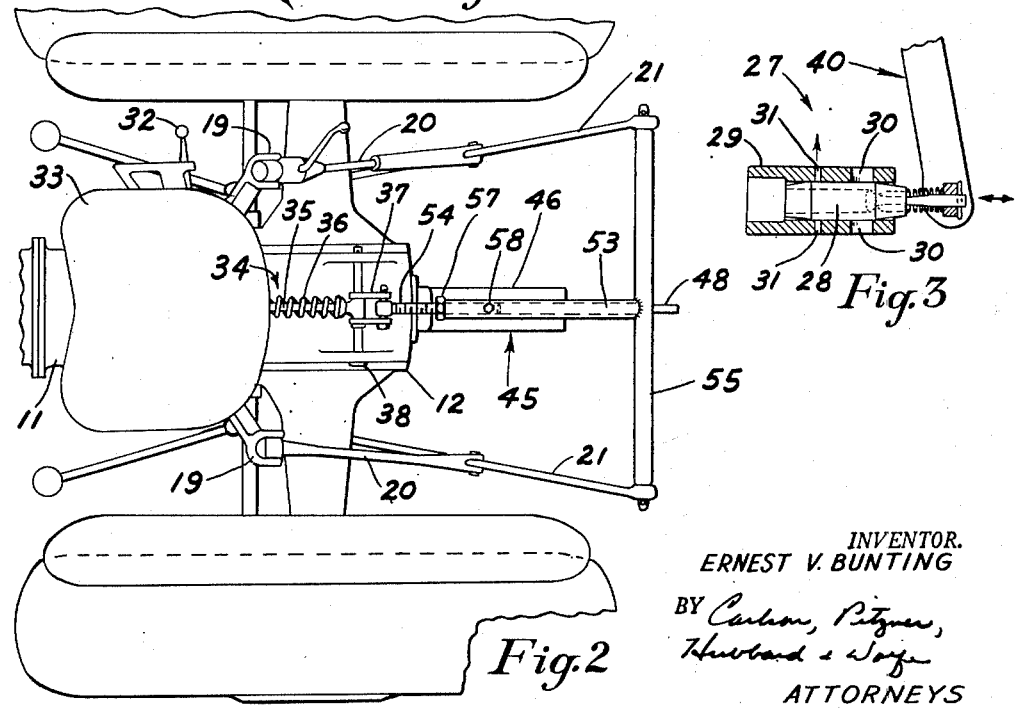
INVENTOR.
ERNEST V. BUNTING
BY
ATTORNEYS

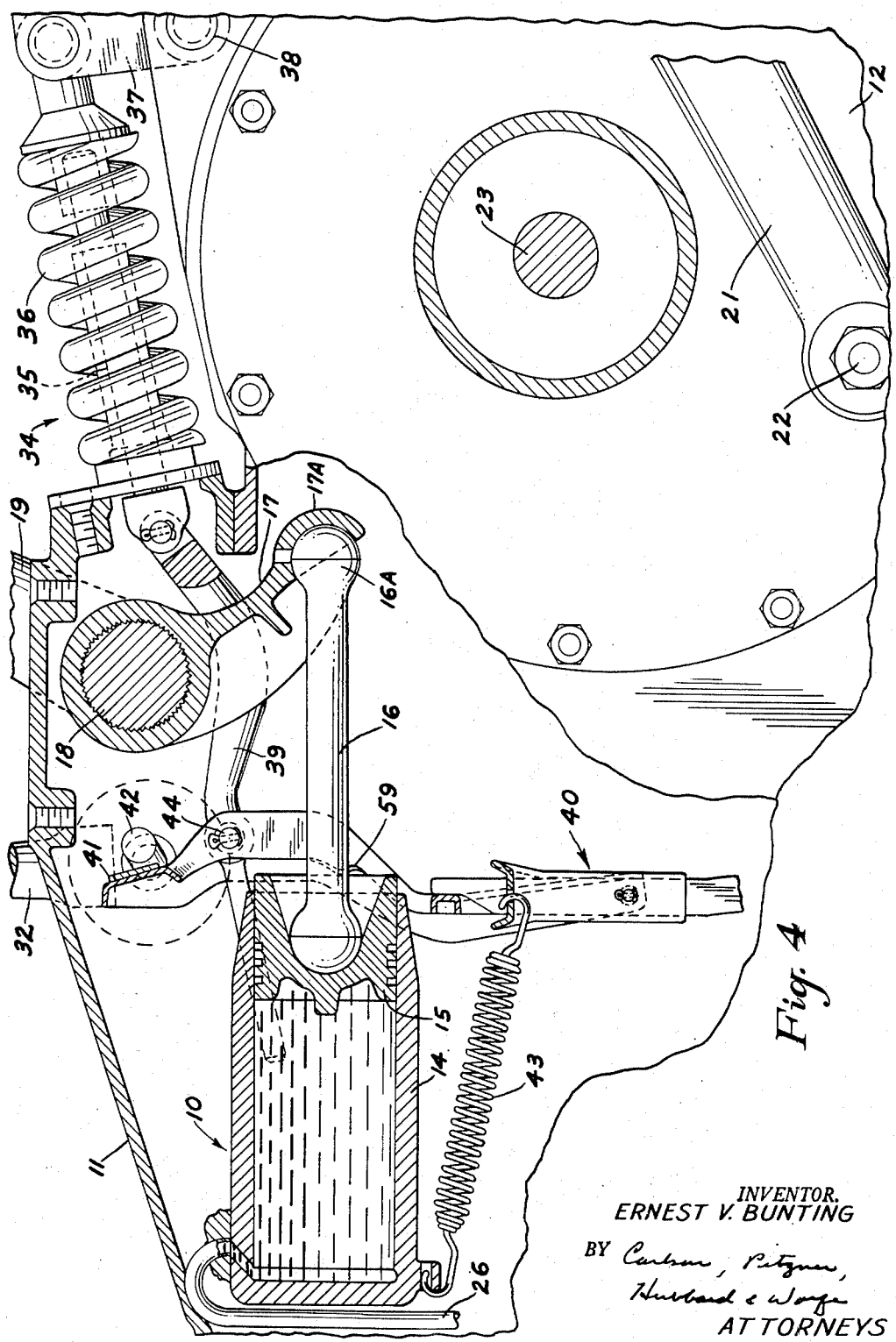

Patented Mar. 23, 1954

2,672,802

UNITED STATES PATENT OFFICE 2,672,802

AUXILIARY HYDRAULIC APPARATUS FOR TRACTORS

Ernest V. Bunting, Dearborn, Mich., assignor to Harry Ferguson, Inc., Detroit, Mich., a corporation of Delaware Application January 2, 1948, Serial No. 226

13 Claims. (Cl. 97—46.03)

The present invention has to do with mechanisms for supplying pressurized hydraulic fluid for the operation of auxiliary devices on tractor drawn implements and the like.

In many instances tractor drawn or borne implements have some one or more elements which it would be advantageous to operate by an auxiliary hydraulic actuator supplied with pressure fluid from the tractor. One of the very numerous examples that might be mentioned is the adjustment of the height of the header assembly on a combine. Others will readily occur to those skilled in the art.

The many tractors currently in use which are equipped with the automatic hydraulic load control system of U. S. patents to Henry George Ferguson No. 2,181,180 and Re. No. 22,642 have suggested to users the possibility of taking the pressure fluid from such system on the tractor and supplying it to the auxiliary device which is to be operated. But difficulties have supervened.

In the system of that patent the fluid pressure depends upon the load sustained by the draft linkage and which may, of course, be widely variant. True, the draft linkage can be held from rising by bolting on a strut from the tractor to the linkage so that the system bears against a fixed obstruction. That is, however, a poor solution, since the pump must run continuously, spilling oil over the emergency relief valve and with rapid deterioration of the latter in such a service for which it was never intended.

Accordingly, one general aim of the present invention is to provide an automatic hydraulic load control system for a tractor which not only operates the main draft linkage but is also suitable for supplying pressure fluid to auxiliaries at a preselected suitable pressure, and without necessity of constant pump operation.

More particularly, it is an object to provide for the simple and ready conversion of existing tractor installations of the general type identified above to accommodate them for the supply of pressurized fluid to an auxiliary at preselected pressure.

Moreover, it is an object to accomplish such conversion without any alterations in the main hydraulic system which would impair its normal use or entail re-adjustments or changes in its internal arrangements to restore it to its previous operating condition.

Further objects and advantages of the invention will become apparent as the following description proceeds, taken in connection with the accompanying drawings in which:

Figure 1 is a fragmentary side elevation of the rear portion of a tractor equipped with an apparatus embodying the present invention, the near rear wheel and fender of the tractor being removed and certain of the parts being sectioned in order better to illustrate the internal arrangement.

Fig. 2 is a plan view of the installation shown in Fig. 1.

Fig. 3 is an enlarged fragmentary longitudinal section of the main valve of the hydraulic system shown on the tractor in Fig. 1.

Fig. 4 is an enlarged vertical sectional view of the main hydraulic ram and certain associated parts included in the apparatus of Fig. 1.

Although one particular embodiment and application of the invention has been shown and described in some detail herein, there is no intention to thereby limit the invention to the precise structural arrangements shown. On the other hand, the intention is to cover all modifications and alternative arrangements falling within the spirit and scope of the invention as expressed in the appended claims.

In the illustrated embodiment of the invention, the same has been shown as utilized in converting the well-known commercial form of automatic draft control of the aforementioned Ferguson Patent No. 2,118,180 to use with hydraulic auxiliaries. The general scheme followed has been to arrange for application of thrust from the main draft linkage directly back to the spring biased controller of the hydraulic unit. The spring of the controller thus serves as a yielding resistance for the draft linkage and thereby causes a pressure to build up in the hydraulic actuator (which is concurrently tending to raise the linkage) and thereby increase the pressure to a value proportional to the compression of the spring.

To arrest further compression of the spring, and thus arbitrarily to limit the fluid pressure to a desired safe value, provision has been made for restoring the main control valve of the system automatically to neutral when such pressure is reached. The requisite valve actuation is, in general, accomplished by fulcruming a floating operating lever for the valve about an abutment. Moreover, by providing a shiftable abutment for fulcruming of the floating lever, the stress in the controller spring (and hence fluid pressure prevailing) at the instant the lever fulcrums on the abutment, can be varied at will by selective adjustment of the relative travel of the lever and abutment prior to contact. The delivery of fluid to the actuator is thus shut off when the selected pressure is reached. Any continuous pumping over a relief valve is thus avoided. On the other hand, any subsequent drop in pressure resulting, for example, from bleeding off fluid to the auxiliary, will automatically move the fulcrum so that fresh fluid is supplied to restore pressure and return the mechanism to balance.

Further consideration of the arrangement employed can best be had by reference to the exemplary illustration.

Referring to Fig. 1, it will be seen that a tractor T, a portion of which is there shown, includes a main hydraulic actuator 10 located in the tractor's casing 11 somewhat forwardly of its differential housing 12. Such actuator is shown as a one-way ram comprising a cylinder 14 in which is slidably received a piston 15. This piston is connected by thrust rod 16 with a depending arm 17 rigid with a rockshaft 18, the ball 16a on the end of the rod being received in a socket 17a in such arm (see Fig. 4 also). Also rigid with the rockshaft 18 is a pair of upwardly and rearwardly inclined crank arms 19 (Fig. 1) from which drop links 20 extends to a pair of trailing lower draft links 21. These draft links are pivoted as at 22 on the rear portion of the tractor below and slightly forward of the tractor's rear axle 23 and are arranged to swing vertically. Supply of pressure fluid to the cylinder 14 urges the piston 15 to the right, thereby rocking the crank arms 19 upward to raise the draft links 21. Similarly, exhaust of fluid from the cylinder permits the piston 15 to retreat leftward, effecting a gravity lowering of the draft links.

Pressure fluid such as oil is supplied to the cylinder 14 by a pump 24 driven continuously by the tractor engine (not shown). The pump draws oil from a suitable sump 25 surrounding it and constituted by the lower portion of the casing 11 and passes from the pump to the cylinder 14 through a conduit 26.

The supply of pressure fluid is regulated by a main valve mechanism designated generally as 27 (see also Fig. 3) located on the intake side of the pump 24. In the present instance such valve mechanism includes a slidable plunger element 28 received in a ported bushing 29. In the mid-position shown the plunger 28 covers both a set of intake ports 30 for the pump and a set of restricted exhaust ports 31 for the cylinder line 26. Consequently, in such mid-position no fluid is delivered by the pump even though it is running and the fluid already in the system is prevented from exhausting.

When the plunger 28 is moved leftward from the mid-position shown in Fig. 3 it uncovers the intake ports 30, permitting the pump to draw oil from the sump and force it into the cylinder 14 through the line 26. The quantity in the system is thus augmented to advance the piston 15. The exhaust ports 31 remain blocked in such case. Similarly, when the plunger 28 is moved rightward from its mid-position, the exhaust ports 31 are opened but the intake ports 30 remain blocked. Accordingly, fluid is bled from the cylinder 14 with a consequent retreat of the piston 15 and lowering of the draft links 21.

The control valve mechanism 27 is operated by the conjoint action of manual and automatic control devices. The manual control device is shown (Figs. 1 and 4) as a hand lever 32 located conveniently alongside the operator's seat 33 and pivoted to swing fore and aft of the tractor. The automatic control device on the other hand is shown as a spring biased controller designated generally as 34. It includes a slidable control rod 35 headed at its inner end to limit its outward travel as well as a compression type helical control spring 36 encircling the rod. Such control spring bears at its forward end against a fixed abutment constituted by the tractor housing and bears at its other end against a collar fixed on the control rod. The rear end of the control rod 35 is pivoted to the central portion of a generally bell crank shaped shackle 37 which is rockably mounted at 38 on the upper portion of the differential housing 12.

Interconnection of the manual and automatic control devices 32, 34 to the valve mechanism 27 is accomplished by a floating lever 40. The forward end of the slidable control rod 35 is pivotally connected to one end of a link 39 which has its other end pivotally connected at 44 with the upper intermediate portion of this floating lever 40. The lower end of the floating lever is pivotally connected to the valve plunger 28. The upper portion of the floating lever 40 is yoke-shaped to straddle the piston 15 and thrust rod 16 (see Fig. 4). At its upper end, the floating lever 40 carries a pad 41 disposed for engagement by an eccentric pin 42 carried by the hand lever 32. A contractile spring 43 urges the floating lever 40 to swing forward. Moreover, this floating lever is preferably of the jointed form of construction illustrated in Ferguson Reissue Patent No. 22,642 of May 15, 1945, in order to accommodate the latch-out type of safety control taught by the latter patent. Further detailing here in that aspect is, however, unnecessary since such feature does not enter directly into the present invention.

For automatic draft control action by the system as so far described, an implement such as a plow (not shown) may be pivotally attached to the rear ends of the draft links 21 and have its upper portion connected by a top thrust link (not shown) to the shackle 37. See Ferguson Patent No. 2,118,180 issued May 24, 1938, for an exemplary installation of this type. With an implement so mounted, it will be lowered into working position when the hand control lever 32 is rocked forward. The latter action contacts the eccentric 42 with the pad 41 on the upper end of the floating lever 40, rocking the latter counterclockwise about the pivot 44. The valve plunger 28 is thus pulled rightward uncovering the bleed ports 41 so that fluid escapes from the cylinder 14 through these ports, permitting the draft linkage and implement to lower.

Upon grounding of the implement it tends to heel forward under ground reaction, thereby urging the control rod 35 forward against the resistance of the control spring 36. As the draft load is thus applied to thrust the control rod inward or forward, the floating lever 40 is permitted to rock clockwise about the eccentric 42 at its upper end under the influence of spring 43. The valve plunger 28 is thus restored to its neutral or mid-position, thereby cutting off further bleeding of fluid from the cylinder 14. The draft load at which such equilibrium condition is established will depend upon the position of the hand lever 32 since that determines the location of its eccentric 42 about which the floating lever 40 fulcrums under the thrust imparted from the control rod.

The system acts automatically to retain the equilibrium condition established as described above. Upon any diminution of draft load the pressure on the control spring 36 is relaxed so that the control rod 35 moves outward, drawing the floating lever 40 rightward to uncover the bleed ports 31, and the implement is thus permitted to go deeper and thereupon increase the draft load again. Similarly, upon any increase in draft load over the preset value, the resultant further inward movement of the control rod 35 allows the floating lever 40 to rock leftward or clockwise still further, under the urging of the spring 43, so that the valve plunger 28 is moved beyond its mid-position to uncover the supply ports 30. The resultant pumping of additional oil into the main cylinder 14 raises the draft linkage so that the implement goes shallower and decreases the draft load again. The system is thus correctively restored from time to time to the preset value of draft load, and with the valve plunger 28 in its mid or neutral position whenever that value is attained.

It is in many instances desirable to provide in addition to the main actuator 10 on the tractor some one or more additional auxiliary hydraulic actuators, usually for operating some controllable element of an implement. Such auxiliary actuators may of course take a variety of forms being either reversible or single acting. For the sake of simplicity, a single acting auxiliary actuator 45 (Fig. 1) has been here indicated. It includes a cylinder 46 in which is received a slidable piston 47 having a piston rod 48 connectible with an implement element (not shown). It is desirable that pressure fluid be supplied for this auxiliary actuator 45 from the pump 24 which is provided on the tractor for the automatic draft control operation described above, thus avoiding the expense of an additional pump. Since the discharge of the pump 24 and main cylinder 14 are permanently interconnected by the line 26, any supply line from the pump for the auxiliary actuator, such as the line 49 here shown, is also, in effect, connected to the main actuator. Suitable control valves may be interposed in the connections to the auxiliary actuator, such as, for example, a three-position manually operable valve 50 which serves to connect a line 51 from the auxiliary actuator either to the pressure supply line 49 or to an exhaust line 52 leading to the sump 25.

The difficulty with the arrangement as to far described is that the pressure conditions prevailing in the main system are likely to be widely variant under different conditions of operation when the valve 50 is opened from time to time to supply fluid to the auxiliary actuator 45. Thus it will be observed that the pressure prevailing in the main system will depend upon the load sustained by the main ram piston 15 and that in turn will depend upon the loading of the draft links 21. It is true that the draft links 21 can be rigidly blocked against rising to retain fluid pressure in the system. In such case, however, whenever the auxiliary valve 50 is closed or the auxiliary piston 47 reaches the end of its travel, the fluid pressure in the system will go up to a maximum value of, for example, 1500 pounds per square inch, and spill over the spring urged safety relief valve (not shown) of the system. Continuous spilling of fluid through this relief valve may damage it, since such safety valves are not designed for continuous blowing. Perhaps even more important, the heating and foaming of the oil and waste of power incident to pumping it through a relief valve are also avoided.

Pursuant to the present invention, provision has been made herein to accommodate the system to maintain a preset fluid pressure for supply to auxiliaries and without running up to a value that will open the relief valve. For that purpose, the system is "loaded" by, in effect, connecting it back on itself and the loading is regulated by adjusting the mechanical connection interposed for the purpose. Thus, in the exemplary embodiment of the invention the loading is accomplished through a thrust link comprised in this instance of a tube 53 telescoped over a rod 54. The tube section 53 is carried by the mid-portion of a transverse drawbar member 55 detachably connected to the trailing ends of the draft links 21. A nut 57 is screw threaded on the rod 54 for adjustment relative thereto and for abutment by the end of the tube 53. By adjusting the nut 57 along the rod 54 the length of the thrust link may be readily varied at will. A dog screw 58 holds the thrust link section in a selected position of axial adjustment and against separating increment when the system is in condition to allow the lower links to descend.

As the draft links 21 tend to swing upwardly by the main hydraulic ram 10, the nose of the tube 53 abutting against the opposed nut 57 imparts a thrust to the shackle 37, tending to rock it forward and compress the spring 36. The resulting stress in the spring 36 thus "loads" the system, that is, builds up pressure in the fluid. The stress in the spring is therefore determinative of the fluid pressure acting against it.

That the system will be "loaded" by interposing the thrust linkage 53, 54 as described above will be clear. But what is not so clear, and is in fact quite unobvious, is that the maximum fluid pressure so attained will automatically be limited (by closure of the main valve mechanism 27) to a value well below that at which the safety valve blows. And what is even more unobvious, in fact rather startling, is that by merely changing the overall length of the thrust linkage 53, 54 the value of the maximum hydraulic pressure attained in the system will be correspondingly altered. Just by changing that length of connection the value of hydraulic pressure made available can be changed at will.

To understand how that comes about will require a more rigorous analysis of the setup. Let us assume first of all that the nut 57 is threaded outwardly along the rod 54 a short distance so that it will abut the end of the tube 53 and thus establish an effective thrust connection shortly before the draft links 21 would otherwise reach their full elevation. In such case, a progressively increasing thrust load is applied to the control device 34 as the links 21 continue to rise. This results in an inward movement of the control rod 35 and connecting link 39 with a resultant rocking of the floating lever 40 in a counterclockwise direction and with the floating lever's projections 59 contacting and fulcruming about the skirt of the piston 15. It will be noted incidentally that the pad 41 on the upper end of the lever 40 leaves contact with the eccentric 42 and takes up the position shown in Figs. 1 and 4. This rocking of the floating lever 40 shifts the valve plunger 28 back to its mid or neutral position, blocking the intake ports 30 so that further delivery of fluid to the master cylinder 14 is stopped. The system is thus brought into equilibrium condition with the fluid under a pressure determined by the thrust load imposed on the main ram piston 15 by the control spring 36 via the thrust linkage 53, 54, hitch links 21 and connecting parts 20, 19, 18, 17 and 16.

The control spring 36 thus serves as the loading device. And as previously noted, the amount of load will depend upon the degree of compression of this spring or, in other words, upon the extent of endwise travel of the control rod 35. Such compression of the spring 36 is arrested as was noted above by fulcruming of the floating lever 40 about the skirt of the main piston 15. This piston skirt thus constitutes a traveling abutment or movable fulcrum point for the floating lever. The further the piston skirt is projected from the cylinder 14 toward the floating lever at the instant of contact of the floating lever with it, the less will be the compression of the spring 36 at the instant the system is put into equilibrium. Conversely, the less the piston is projected from the cylinder, or the further to the left it is at the instant of fulcruming of the floating lever on it, the greater will be the compression of the spring 36 at such time. The degree of fluid pressure existing in the system when equilibrium is established and the valve element 28 centered, is thus dependent upon the degree of projection of the piston 15 from its cylinder 14 the instant the floating lever 40 fulcrums on it.

The degree of projection of the main piston 15 at such instant is, however, determined by the effective length of the thrust linkage 53, 54. As the latter linkage is gradually extended in effective length, compression of the spring 36 is initiated with a lesser and lesser degree of projection of the piston 15 from the end of the cylinder 14. Accordingly, the pressure prevailing in the system when equilibrium is established can be adjusted simply by altering the effective length of the thrust linkage 53, 54. Lengthening the thrust linkage raises the pressure. Shortening it lowers the pressure.

The range of such pressure adjustment is limited, however, particularly as to the maximum value that may be attained. In a mechanical sense the range of adjustment is limited by the range of movement of the piston skirt beyond the confines of the cylinder. On the one hand, when the thrust linkage 53, 54 is so long that the floating lever 40 fulcrums on the end of the cylinder 14 itself before the piston emerges at all, we are at the upper limit of the range of pressure adjustment. On the other hand, when the thrust linkage is so short that the tube 53 does not go solid against the nut 57 before cut-off due to completion of rise of the draft links 21, we have no stressing of the control spring and hence no pressure control. Adjustment of the length of the thrust linkage can be made so that the pressure can be varied upwardly from approximately a zero value.

Considering further the upper limit condition, it will be perceived that if the effective length of the thrust linkage 53, 54 is made great enough, the inwardly thrust control rod 35 will swing the floating lever 40 over against the end of the cylinder 14 before the piston 15 emerges at all. Then the floating lever will fulcrum about the end of the cylinder as a fixed abutment, restoring the valve mechanism to neutral. Supply of further fluid is in that manner arrested with pressure at a value well below that required to open the safety valve. Any further lengthening of the thrust linkage will not raise the pressure for the cylinder will still form a fulcruming abutment of unaltered position for the floating lever.

It will be understood that the pressures obtainable in the system are dependent upon the strength of the spring and the lever system by which spring force is imposed on the fluid in the main cylinder. What has been said therefore will be true of all systems of this character even though the physical characteristics thereof are changed.

Let us examine now the action of an auxiliary with the fluid brought under pressure as described above. It will be assumed that the thrust linkage is adjusted to some length greater than that for the lower limit of the pressure range previously noted. In such case, the sliding valve element 28 will be in its mid or neutral position, as shown in Figs. 1 and 3. The operating parts for the valve will occupy the position shown in Figs. 1 and 4 with the exception that should the thrust linkage be adjusted long enough for maximum pressure the piston 15 will be inward of the cylinder so that the lever 40 is against the cylinder end rather than the piston skirt. The system is now ready for the supply of pressure fluid to the auxiliary actuator to supply pressure fluid to some auxiliary device such for example as the actuator 45, the only limitation being that the pressure load required of the auxiliary device must be less than that established in the main hydraulic system.

Flow of pressure fluid into the auxiliary actuator 45 is initiated by turning the valve 50 to interconnect lines 49 and 51 while blocking the exhaust line 52. Fluid is thereupon bled from the main cylinder 14 through lines 26, 49 and 51 into the auxiliary actuator. Simultaneously, the pressure of such fluid will drop to the value imposed by the load prevailing on the auxiliary actuator. The withdrawal of fluid from the main cylinder will permit piston 15 to retreat to the left. Such tendency is moreover augmented by the drop in fluid pressure below the value of that previously required to retain the main control spring 36 in its previous state of compression. A rightward or outward motion of the link 39 takes place under the influence of the main spring 36 whose compression is being relaxed. The floating lever 40 is thus shifted in a direction to uncover the supply ports 30 so that the additional fluid is supplied to the system. Such shift of the floating lever is augmented in the event it has been resting against the piston 15 (rather than the cylinder 14) since the piston retreats concurrently with the release of stress in the control spring. Disturbance of equilibrium by withdrawal of fluid to the auxiliary line thus serves to bring about automatically a restoration of previous conditions. If the delivery rate of the pump 24 is great enough, there will be recurrent closing and opening of the ports 30 as the pump periodically overtakes the demands of the auxiliary device which is taking fluid.

When the auxiliary piston 47 reaches the end of its path of travel in the cylinder it is, of course, mechanically blocked. However, pressure in the system quickly rises to the initial value required for equilibrium and in which the valve element 28 is restored to neutral. Similarly, if the hand valve 50 be turned at any time to its blocking position, further motion of the auxiliary actuator will be arrested and pressure in the main part of the system will likewise return almost instantly to its preset value.

It will thus be seen that the pump supplies additional fluid only as required to fulfill the demands of the auxiliary device or devices. It stops delivery as soon as that is met. There is no pumping of excess fluid through a relief valve.

To retract the auxiliary actuator piston 47, it is necessary merely to turn the valve 50 to its drain position. Thereupon further supply of fluid from line 49 is blocked, whereas line 51 is connected to the drain line 52 so that fluid is expelled from the auxiliary actuator through such connections and back to the sump under the influence of the load on the auxiliary actuator.

In the event that a simple cut-off valve is used at 50 between the auxiliary lines 49, 51, the exhaust line 52 can be omitted. In such case the main system is brought under pressure by imparting stress from the control spring 36 back through the thrust linkage 53, 54, all just as previously described. Again, just as before, fluid is fed to the auxiliary by opening the valve 50 and the system will act just as before. To retract the auxiliary actuator piston 47 now, however, the hand lever 32 is swung downward. That swings the floating lever 40 counterclockwise, opening drain ports 31. Accordingly, the draft links 21 sink and the auxiliary piston retracts. It should be observed, however, that neither in this setup, nor in that first described, is the hand lever shifted to adjust pressure. It merely is pulled upward as a preliminary to establishing pressure, or swung downward to relieve it altogether.

To recapitulate, stress in the main control spring 36 is used for artificially loading the main hydraulic system of what is otherwise an automatic draft control system. The pressure established by such loading can readily (merely by turning nut 57) be varied from a low or nearly zero value up to a safe maximum value and upon further adjustment that maximum value is simply retained. Moreover, the system acts automatically to restore to the preset value of pressure throughout bleeding off of fluid required for auxiliaries. Only when demanded by the automatic controls, however, is there any pumping of further fluid. The whole operation is thus accomplished with ease of pressure adjustment and within a range of values sufficiently below any at which a safety valve of the system will blow. Moreover, the apparatus can readily be restored for automatic draft control operation merely by dropping the hitch links 21 and detaching the thrust linkage 53, 54.

I claim as my invention:

1. The combination of a tractor having a vertically swingable draft linkage trailing therefrom, a main actuator operatively connected to said linkage for raising the same and having relatively movable piston and cylinder elements, a source of pressure fluid for said actuator powered from the tractor engine, an abutment movable in unison with one of said relatively movable elements of said main actuator, a rockable floating lever positioned to intercept said abutment in course of the latter's travel for fulcruming about said abutment, a spring, a mechanical connection disposed between said draft linkage and said spring for stressing the latter upon rise of said draft linkage to thereby progressively increase the fluid pressure in said cylinder, said connection including an adjustable element for varying the point in the rise of said draft linkage at which stressing of said spring is initiated, means including a control rod interposed between said mechanical connection and said floating lever for shifting said lever toward and from said abutment through a distance proportional to increase and decrease in stress in said spring, valve means connected with said floating lever and operable in response to fulcruming of said lever about said abutment to cut off the supply of pressure fluid from said source to said cylinder, and means for diverting to an auxiliary hydraulic device or the like fluid pressurized by the load applied to said actuator by stress in said spring.

2. In a hydraulic power unit of the general type described, the combination of a piston and cylinder type main actuator having a pump for supplying pressure fluid thereto, valve mechanism for controlling the supply and exhaust of pressure fluid to and from said actuator and being shiftable from a neutral mid-position alternatively to supply and exhaust positions, a floating lever connected with said valve mechanism for shifting the same between said positions, a spring, power lift means connected with said piston for movement in unison therewith, a thrust linkage connected between said power lift means and said spring for applying stress to the latter from said piston to thereby pressurize the fluid behind said piston, said interconnecting thrust linkage including a connection of adjustable length to predetermine the point in piston travel at which spring stress is initiated, a fulcruming abutment for said floating lever movable toward the same in unison with said piston, means for displacing said lever bodily toward said abutment proportionately to the loading of said spring, and means for diverting to an auxiliary hydraulic device or the like fluid pressurized by the load applied to said actuator by stress in said spring means.

3. The combination of a tractor having a vertically swingable draft linkage trailing therefrom, a piston and cylinder type main hydraulic actuator on said tractor operatively connected to said linkage for swinging the same upward, a spring on said tractor, a source of pressure fluid for said actuator powered from the tractor engine, a thrust linkage disposed in interconnecting relation with said draft linkage and said spring for stressing the latter upon rise of said draft linkage to thereby increasingly pressurize the fluid behind said piston as said draft linkage rises, a valve mechanism having alternate fluid supply and exhaust positions for said actuator as well as a neutral position in which both supply and exhaust are blocked, a manual control device for shifting said valve mechanism to supply position to initiate rise of said linkage, and automatic control means disposed in coacting relation with said manual control device to automatically restore said valve mechanism to neutral in response to attainment of a predetermined stress in said spring.

4. In a hydraulic power system for a tractor having a movable draft linkage thereon, the combination of a main hydraulic actuator operatively connectible with said draft linkage for moving the same, a source of pressure fluid, valve means for controlling the supply of pressure fluid from said source to said actuator, means for bleeding off pressurized fluid from said actuator to an auxiliary hydraulic device, and means including a valve operating connection extending between said draft linkage and said valve means for imposing a progressively increasing load on said actuator with movement of said draft linkage in a given direction to correspondingly increasingly pressurize the fluid available therefrom, said valve operating connection and said draft linkage being adapted to cause said valve means to cut off further supply of fluid to said actuator in response to attainment of a preset value of pressure therein and with subsequent additions of fluid only as required to compensate for withdrawals made by said bleeding means.

5. In a hydraulic power system for a tractor having a movable draft linkage thereon, the combination of a main hydraulic actuator operatively connectible with said draft linkage for moving the same, a fluid pump connected to said actuator, a valve mechanism having a mid-position in which it blocks both a supply port for said pump and an exhaust port from said actuator and being shiftable in opposite directions from said mid-position to uncover respective ones of said ports, means for bleeding off pressurized fluid from said actuator to an auxiliary hydraulic device, and an automatic control for said valve including a movable operating member, a thrust transmitting connection interposed between said movable operating member and said draft linkage, and means connected between a fixed point on the tractor and said thrust transmitting connection for yieldably resisting the transmission of thrust from said draft linkage to said movable operating member, and movable abutment means on said main actuator disposable in intercepting relation with said movable operating member for returning said valve mechanism to said position after said main actuator has been set in operation due to displacement of said valve mechanism from its mid-position.

6. For use on a tractor equipped with an automatic draft control system of the general type disclosed and including a main hydraulic ram connected to raise a trailing pair of laterally spaced draft links and supplied with pressure fluid under the control of a valve shiftable by a spring biased control element on the rear of the tractor, an attachment for conditioning such system for supplying fluid at a selectively limited pressure to an auxiliary actuator, said attachment comprising the combination of a thrust link including rod and sleeve elements arranged with the sleeve slidably telescoped over said rod, an abutment threadedly adjustable on said rod and positioned to abut the nose of said sleeve to thereby define the effective overall thrust length of said thrust link, and a drawbar element arranged to span the draft links and having detachable connections for securing the same to such links, one of the thrust link elements being fixed to and projecting upwardly and forwardly from the center portion of said drawbar element, the free end of the remaining one of the thrust link elements being susceptible of detachable pivotal connection with the control element.

7. For use on a tractor equipped with an automatic draft control system of the general type disclosed and including a main hydraulic ram connected to raise a trailing draft linkage and supplied with pressure fluid under the control of a valve shiftable by a spring biased control element on the rear of the tractor, an attachment for conditioning such system for supplying fluid at a selectively limited pressure to an auxiliary actuator, said attachment comprising the combination of a thrust link constituted by a sleeve element telescoped over a rod element, means for detachably connecting respective ones of said elements to the draft linkage and to the control element on the tractor, and adjustable stop means on said rod element for varying the relative free travel of said links permitted by sliding of said sleeve element along said rod element upon application of thrust.

8. An attachment for accomplishing the supply of pressure fluid to auxiliaries at a pressure not exceeding a preset maximum from a hydraulic automatic depth control system on a tractor equipped with a draft linkage raised by a main hydraulic actuator and also equipped with a spring biased controller for the actuator operative in normal automatic depth control operation to automatically retain the fluid supplied to said actuator in fixed volume upon imposition on the controller of a predetermined stress, said attachment comprising the combination of a thrust linkage susceptible of detachable connection between the draft linkage and the controller, said thrust linkage having an effective length situating the draft linkage in the vicinity of its fully raised position, and means for adjusting the effective length of said thrust linkage to vary said preset maximum pressure with the draft linkage remaining in the vicinity of its fully raised position.

9. The combination of a tractor having a vertically swingable draft linkage trailing therefrom, a main actuator operatively connected to said linkage for raising the same and having relatively movable piston and cylinder elements, a source of pressure fluid for said actuator powered from the tractor engine, an abutment movable in unison with one of said relatively movable elements of said main actuator, a rockable floating lever positioned to intercept said abutment in course of the latter's travel for fulcruming about said abutment, a spring, a thrust linkage connected between said draft linkage and said spring for stressing the latter upon rise of said draft linkage with a resulting progressive increase of the fluid pressure in said cylinder, said thrust linkage including manually adjustable means for varying the effective length of such thrust linkage, a mechanical force transmitting connection between said floating lever and said spring for shifting said lever toward and from said abutment in accordance with corresponding increases and decreases in spring stress, valve means connected with said rockable floating lever and operable in response to fulcruming of said lever about said abutment to cut off the supply of pressure fluid from said source to said cylinder, and means for diverting to an auxiliary hydraulic device fluid pressurized by the load applied to said actuator by stress in said spring.

10. The combination of a tractor having a vertically swingable draft linkage trailing therefrom, a main actuator operatively connected to said linkage for raising the same and having relatively movable piston and cylinder elements, a source of pressure fluid for said actuator powered from the tractor engine, a spring, a thrust transmitting mechanical connection from said draft linkage to said spring for stressing the latter upon rise of said draft linkage to thereby progressively increase the fluid pressure in said cylinder, said connection including an adjustable element for varying the point in rise of said draft linkage at which stressing of said spring is initiated, a floating lever, a first abutment arranged in fixed position adjacent an intermediate portion of said lever for fulcruming of the latter about said abutment upon shift of said lever into contact therewith, a second fulcruming abutment for said lever movable in unison with one of said elements of said actuator from a point remote from said lever past said first mentioned abutment and into proximity with said lever, means linking said thrust transmitting mechanical connection and said lever for shifting said lever toward and from said abutments in accordance with corresponding increase and decrease in stress in said spring, valve means connected with said lever and operable in response to fulcruming of said lever about either of said abutments to cut off the supply of pressure fluid from said source to said cylinder, and means for diverting to an auxiliary hydraulic device fluid pressurized by the load applied to said actuator by stress in said spring.

11. The combination of a tractor having a vertically swingable draft linkage trailing therefrom, a one-way hydraulic ram having an open-ended cylinder with a piston slidably received therein and connected to said linkage for raising the same, a pump having its outlet connected to said cylinder, valve means shiftable from a neutral position alternatively into supply and exhaust positions, said valve means blocking both the intake of said pump and an exhaust connection for said cylinder when in said neutral position and opening respective ones of said connections in its supply and exhaust positions, a rockable floating lever connected with said valve mechanism for actuating the same and arranged with its center line extending generally transversely across the open end of said cylinder for fulcruming of said lever about the end of said cylinder or about the end of said piston when the latter projects beyond the cylinder end, said piston being movable toward said lever upon raising said draft linkage, a spring, a thrust transmitting mechanical connection from said draft linkage to said spring for stressing the latter upon rise of said draft linkage, said connection including an adjustable element for varying the point in the rise of said draft linkage at which stressing of said spring is initiated, means linking said mechanical connection and said lever for shifting said lever toward and from said abutment in accordance with increase and decrease in stress in said spring, and means for diverting pressure fluid from said cylinder to an auxiliary hydraulic device.

12. The combination of a tractor having a hitch linkage pivoted thereon, a hydraulic actuator connected to said linkage for raising the same, valve means for controlling the supply of pressure fluid to said actuator, a mechanical valve operating connection extending from said hitch linkage to said valve means, a yielding spring interposed between a point fixed relative to the tractor and a point on said valve operating connection, said yielding spring being adapted to resist rise of said linkage, said mechanical valve operating connection being adapted for automatically operating said valve means to limit the fluid pressure prevailing in said actuator to a predetermined maximum value as said linkage rises against the resistance of said spring.

13. The combination of a tractor having a movable draft linkage thereon, a main hydraulic actuator operatively connected with said linkage for raising the same, a valve mechanism shiftable from a neutral position into alternative supply and exhaust positions in which said actuator is respectively connected to a source of pressure fluid and to exhaust, control mechanism including a movable member and a control spring acting on the member, said member having an operative connection with said valve mechanism effective to shift the same in response to movements of the member, a thrust linkage of selectively variable effective length connected between said draft linkage and said movable member operative to displace the member and stress said control spring in response to the rise of the draft linkage and to impose on said actuator the load resulting from the stressing of said control spring and thereby pressurize the fluid in said actuator, said member acting through its connection with the valve mechanism to correctively shift the same to establish and retain an equilibrium condition in which said spring is predeterminedly stressed, and means for bleeding off pressurized fluid from said actuator to an auxiliary hydraulic device.

ERNEST V. BUNTING.

References Cited in the file of this patent

UNITED STATES PATENTS

| Number | Name | Date |
|---|---|---|
| Re. 22,642 | Ferguson | May 15, 1945 |
| 2,118,180 | Ferguson | May 24, 1938 |
| 2,273,875 | Livesey et al. | Feb. 24, 1942 |
| 2,347,898 | Ferguson | May 2, 1944 |
| 2,349,257 | Evans et al. | May 23, 1944 |
| 2,356,231 | Ferguson | Aug. 22, 1944 |
| 2,392,903 | Currie | Jan. 15, 1946 |
| 2,438,553 | Fraga | Mar. 30, 1948 |
| 2,441,630 | Heitshu | May 18, 1948 |
| 2,455,727 | Bunting | Dec. 7, 1948 |

FOREIGN PATENTS

| Number | Country | Date |
|---|---|---|
| 557,209 | Great Britain | Dec. 9, 1943 |